(12) United States Patent
Hillgaertner

(10) Patent No.: US 10,538,944 B2
(45) Date of Patent: Jan. 21, 2020

(54) UNLOCKING DEVICE FOR A VEHICLE HOOD

(71) Applicant: Dr. Ing. h.c. F. Porsche Aktiengesellschaft, Stuttgart (DE)

(72) Inventor: Klaus Hillgaertner, Wurmberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 1015 days.

(21) Appl. No.: 14/963,288

(22) Filed: Dec. 9, 2015

(65) Prior Publication Data

US 2016/0168884 A1 Jun. 16, 2016

(30) Foreign Application Priority Data

Dec. 16, 2014 (DE) .................. 10 2014 118 690

(51) Int. Cl.
| | | |
|---|---|---|
| *E05B 83/24* | (2014.01) | |
| *E05B 85/10* | (2014.01) | |
| *F16C 1/14* | (2006.01) | |
| *E05B 83/16* | (2014.01) | |
| *F16C 1/10* | (2006.01) | |
| *B60J 7/19* | (2006.01) | |
| *E05B 79/20* | (2014.01) | |

(52) U.S. Cl.
CPC .............. *E05B 83/243* (2013.01); *B60J 7/19* (2013.01); *E05B 79/20* (2013.01); *E05B 83/16* (2013.01); *E05B 83/247* (2013.01); *E05B 85/10* (2013.01); *F16C 1/102* (2013.01); *F16C 1/14* (2013.01); *F16C 1/145* (2013.01); *F16C 2226/72* (2013.01)

(58) Field of Classification Search
CPC ........ E05B 83/243; E05B 79/20; E05B 83/16; E05B 83/247; E05B 85/10; E05B 83/24; E05B 83/18; E05B 85/103; B60J 7/19; B60J 7/1851; B60J 7/1856
USPC ......................................................... 292/196
See application file for complete search history.

(56) References Cited

U.S. PATENT DOCUMENTS

| | | | | |
|---|---|---|---|---|
| 2,702,063 | A * | 2/1955 | Poupitch ................. | F16B 39/26 411/134 |
| 3,831,406 | A | 8/1974 | Gebhard et al. | |
| 5,123,795 | A * | 6/1992 | Engel ...................... | F16B 21/02 411/552 |
| 6,598,912 | B2 * | 7/2003 | Hillgaertner .......... | E05B 13/005 292/225 |
| 2002/0050707 | A1 * | 5/2002 | Nishide ................... | B60R 22/22 280/801.1 |

(Continued)

FOREIGN PATENT DOCUMENTS

| | | |
|---|---|---|
| DE | 31 01 176 | 8/1982 |
| DE | 103 59 737 | 7/2005 |

OTHER PUBLICATIONS

German Search Report dated Jun. 1, 2015.
Indian Examination Report dated May 16, 2019.

*Primary Examiner* — Nathan Cumar
(74) *Attorney, Agent, or Firm* — Gerald E. Hespos; Michael J. Porco; Matthew T. Hespos

(57) ABSTRACT

An unlocking device has a release lever that is connected pivotably to a carrier element and is in each case connected via Bowden cables to a catch hook for clip elements in a vehicle hood. The catch hook is moved by the Bowden cables that are actuated via the release lever, counter to the spring force of a spring element into an unlocking position for opening the vehicle hood.

7 Claims, 5 Drawing Sheets

(56) References Cited

U.S. PATENT DOCUMENTS

2002/0104400 A1\* 8/2002 Hillgaertner .......... E05B 13/005
                                                    74/501.6

\* cited by examiner

UNLOCKING DEVICE FOR A VEHICLE HOOD

CROSS REFERENCE TO RELATED APPLICATION

This application claims priority under 35 USC 119 to German Patent Appl. No. 10 2014 118 690.7 filed on Dec. 16, 2014, the entire disclosure of which is incorporated herein by reference.

BACKGROUND

1. Field of the Invention

The invention relates to an unlocking device or system for a vehicle hood, in particular for a front flap of a motor vehicle.

2. Description of the Related Art

A known unlocking device for a vehicle hood has a carrier element that carries a Bowden cable. The Bowden cable is actuable by a release lever and is connected to a catch hook of the vehicle. Actuation of the release lever causes the Bowden cable to adjust the catch hook into an unlocking position so that the hood can be opened.

It is an object of the invention to provide an unlocking device for a vehicle hood that ensures a separation of control functions or actuating forces during pivoting of a release or control lever of the unlocking device.

SUMMARY

The invention relates to an unlocking system that avoids excessive and increasing play in the unlocking system by separation of functions during actuation of the unlocking system. More particularly, the unlocking system has a carrier element that comprises a cylindrical bearing sleeve with an elongate bush shaft. The unlocking system further has a release lever or control lever connected on a head side. The bearing sleeve is guided in an axially rotatable manner in an elongate spacer bushing that is held in a positionally fixed manner in a base plate via a quarter-turn fastener. A serrated ring is held at the free end of the cylindrical bearing sleeve and is supported axially with respect to the spacer bushing. This design and arrangement of the structural elements of the device ensures that absorption of transverse forces is separated from an axial guide. The long spacer bushing is connected in a form-fitting manner to the base plate via a quarter-turn connection so that the radial actuating forces F1 introduced to the carrier element by the manual force applied to the release lever are absorbed and conducted away via the base plate to the connection. The serrated ring only has to transmit the small axial forces F2 arising due to a possible oblique tension.

A cup-shaped annular bushing is formed around the outer circumference of the carrier element and forms a receiving space for a torsion spring element, over which on the A head of the cup-shaped annular bushing has an annular rotational-guiding groove. An upper end is arranged in the annular rotational-guiding groove. A lower end of the spacer bushing has a bearing ring that rests on an upper side of the positionally fixed base plate and is fastened in the base plate via the quarter-turn connection. The carrier element is supported axially and is guided rotatably in the annular groove of the head of the cup-shaped annular bushing.

A lower end of the cup-shaped annular bushing of the carrier element may be supported rotatably on the upper surface of the bearing ring of the elongate spacer bushing. The lower surface of the bearing ring rests on the base plate. Thus, the annular bushing is mounted via the bearing ring on the base plate and is combined with the annular bushing via the connection to form a fixed constructional unit and therefore the carrier element is securely guided rotatably on the spacer bushing.

The bearing ring of the spacer bushing engages over the base plate from above and, in the fastening position, the bearing ring is connected in a positionally fixed manner to the base plate via the quarter-turn fastener. On the lower side of the bearing ring, the quarter-turn fastener comprises, in a known manner, cams that are insertable into corresponding recesses of the base plate and, by rotation of the bearing ring, the bearing ring is locked fixedly in the base plate.

To unlock and lock the catch hook from and to the vehicle hood, an upper end of the torsion spring element is connected to the carrier element in the receiving space of the cup-shaped annular bushing and is held by a turned-away, lower end in a hooked-in manner in the bearing ring of the spacer bushing. By means of this arrangement and connection of the torsion spring element firstly on and to the carrier element and secondly on and to the bearing ring of the annular bushing, after an unlocking movement of the release lever, said release lever is reset again via the spring force.

An exemplary embodiment of the invention is illustrated in the drawings and described in more detail below.

DETAILED DESCRIPTION

Figure 1:
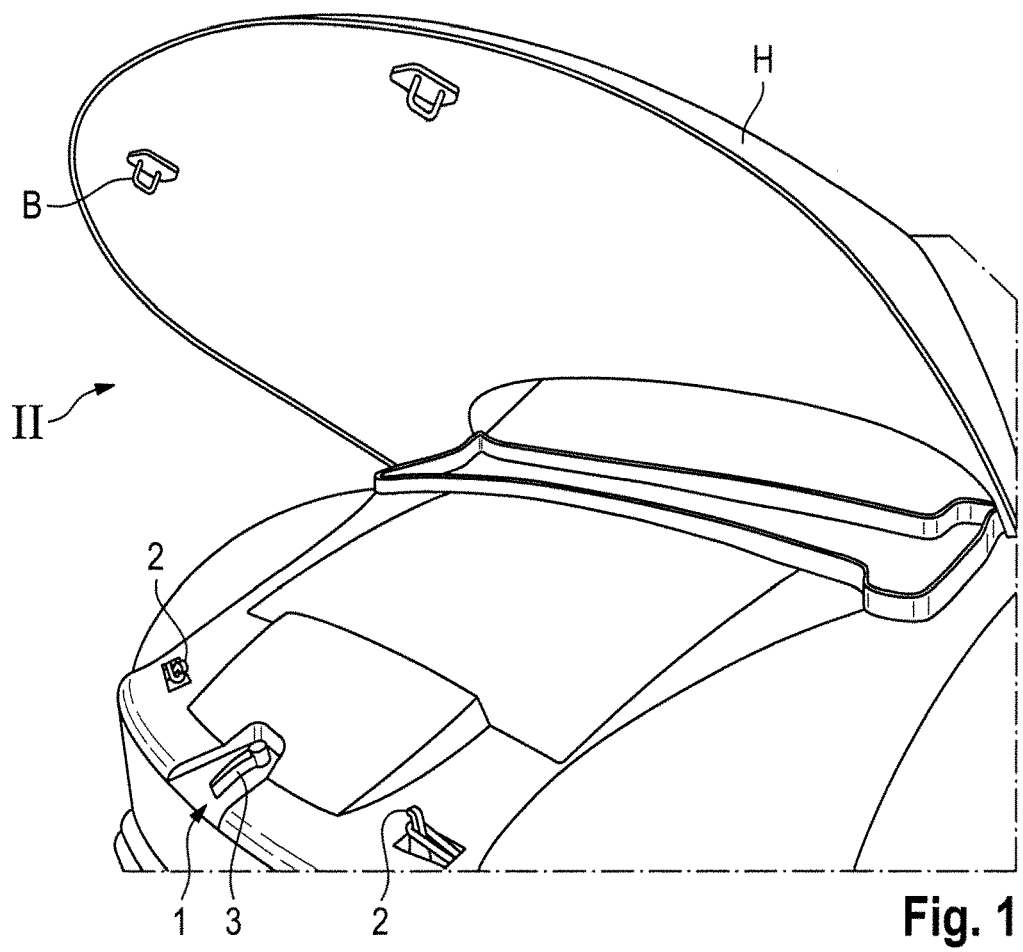
FIG. 1 shows a view of the unlocking device with catch hooks in the vehicle body and clip elements in the vehicle hood.

An unlocking device 1 for catch hooks 2 of a vehicle hood H is actuated via a release lever 3 or control lever that is fastened pivotably to a carrier element 4 via a toothing 5. Catch hooks 2 are connected to the carrier element 4 via Bowden cables 6, 7 and the release lever 3 can adjust the catch hooks 2 into an unlocking position II. In this position II clip elements B or the like in the vehicle hood H are released and the vehicle hood H then can be pivoted up into an open position. The catch hooks 2 engage behind the clip elements B again for locking when the vehicle hood H is closed.

The carrier element 4 comprises a cylindrical bearing sleeve 9 that includes an elongate bushing shaft 8 and is guided in an axially rotatable manner in an elongate spacer bushing 11 that is held in a positionally fixed manner on a base plate 10. A serrated ring 14 is fastened around the lower end 12 of the bushing shaft 8 and is supported against the axial free end 15 of the spacer bushing 11. A cup-shaped annular bushing 16 is formed on the carrier element 4 and defines a receiving space 17 for a spring element 18. A rotationally-guiding groove 20 is formed in the head 19 of the annular bushing 16 and faces into the receiving space 17 for receiving an axial end 21 of the carrier element 4.

The axial end 21 of the carrier element 4 is fit into the groove 20 so that the carrier element 4 is guided rotatably relative to the annular bushing 16. The lower end portion of the spacer bushing 11 has a bearing ring 23 that rests on the upper side of the base plate 10 and is fastened to the base plate 10 via a "quarter-turn connection" 24.

The lower end 21a of the cup-shaped annular bushing 16 is supported rotatably by on the bearing ring 23, and the lower side of the bearing ring 23 rests on the base plate 10. The bearing ring 23 of the spacer bushing 11 engages over the base plate 10 from above and, in a fastening position, is fixed on the base plate 10 via the quarter-turn connection 24.

The torsion spring 18 has an upper end 25 that is connected to the carrier element 4 at a position in the receiving space 17 of the cup-shaped annular bushing 16. The torsion spring 18 also has a turned-away lower end 26 that is hooked and held in a receiving opening in the bearing ring 23 of the spacer bushing 11.

Figure 2:
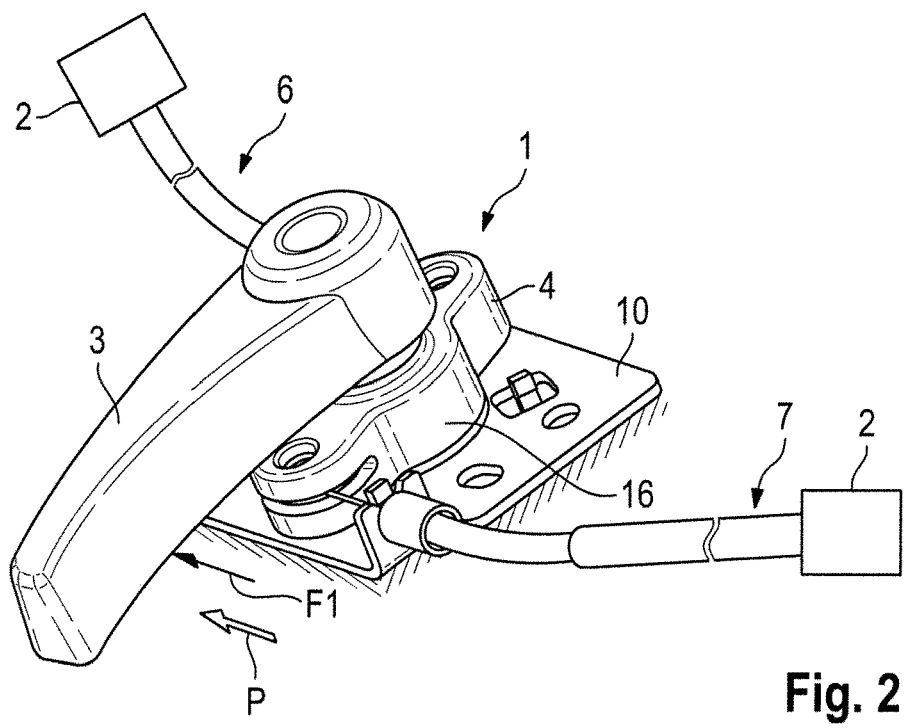
FIG. 2 is an illustration of the unlocking device with a release lever arrested against the carrier element and Bowden cables leading away to the catch hooks in the vehicle body.
Figure 2A:
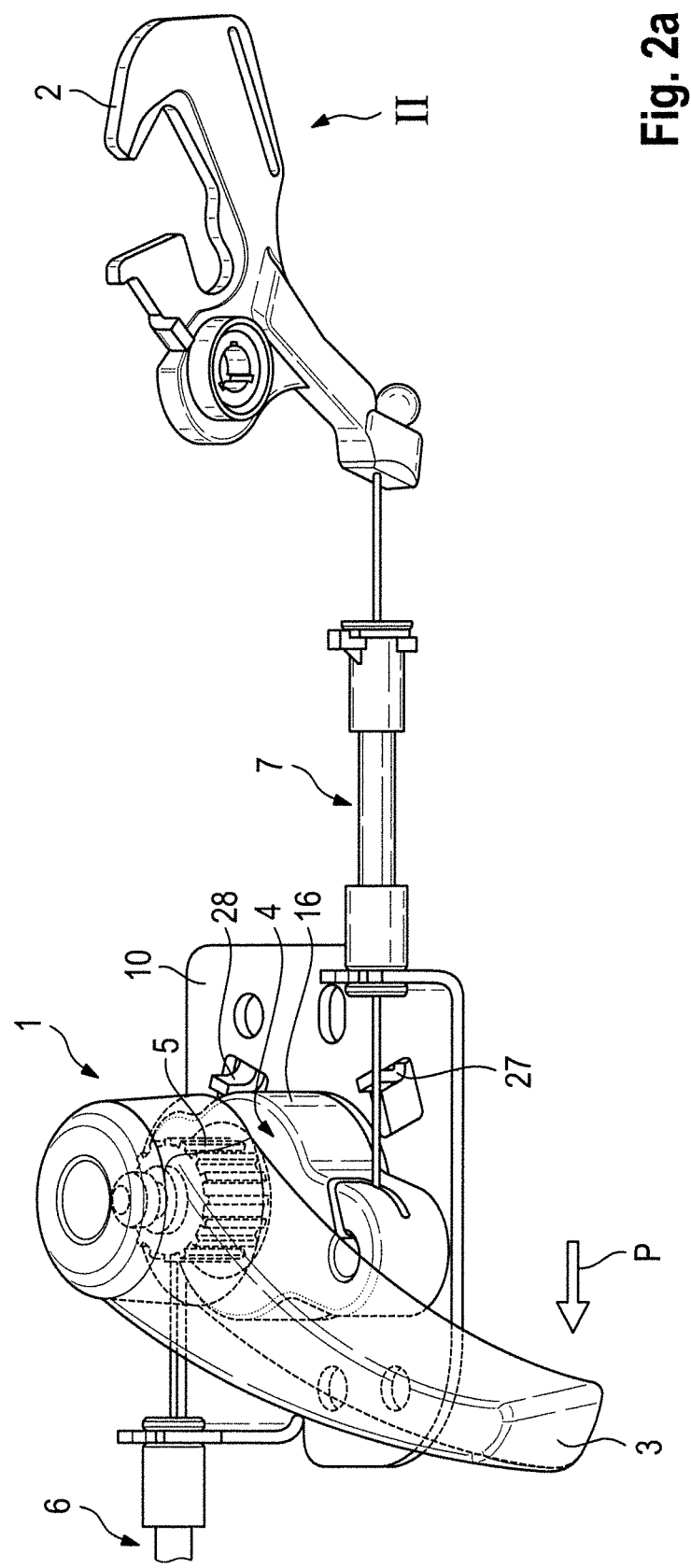
FIG. 2a is an illustration of the unlocking device in an actuated unlocking position II.
Figure 3:
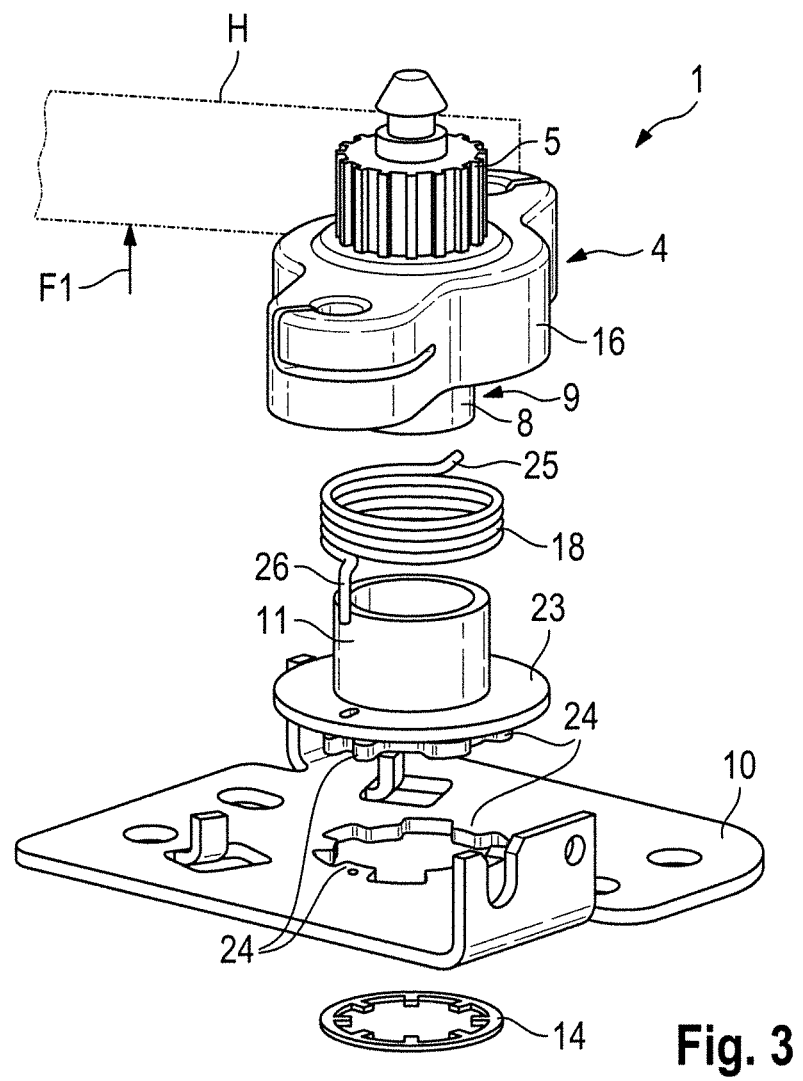
FIG. 3 is an exploded illustration of the unlocking device with carrier element, torsion spring, spacer bushing with bearing ring, base plate and serrated ring.
Figure 3A:
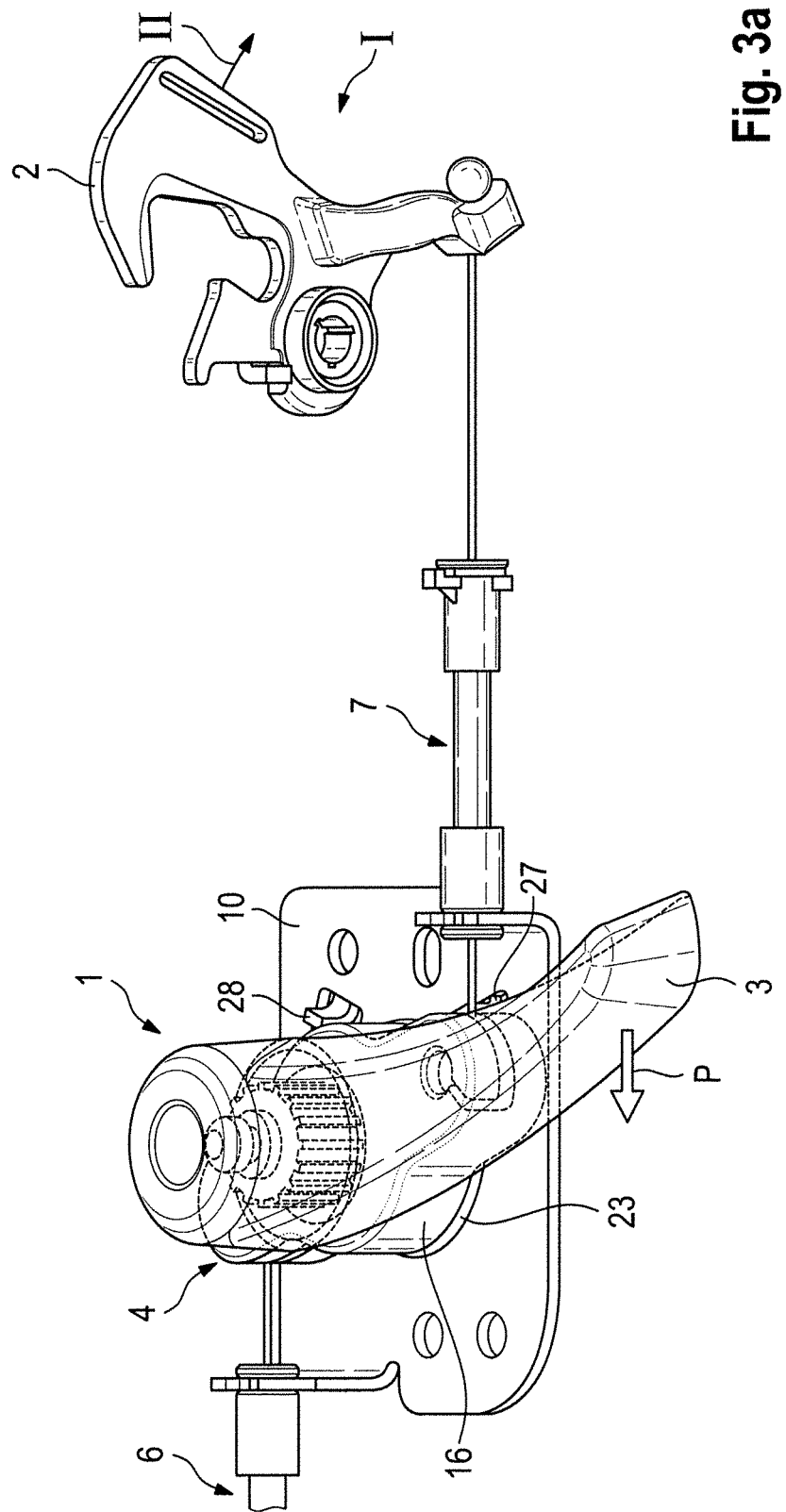
FIG. 3a is an illustration of the unlocking device with catch hooks in an unactuated locking position I.
Figure 4:
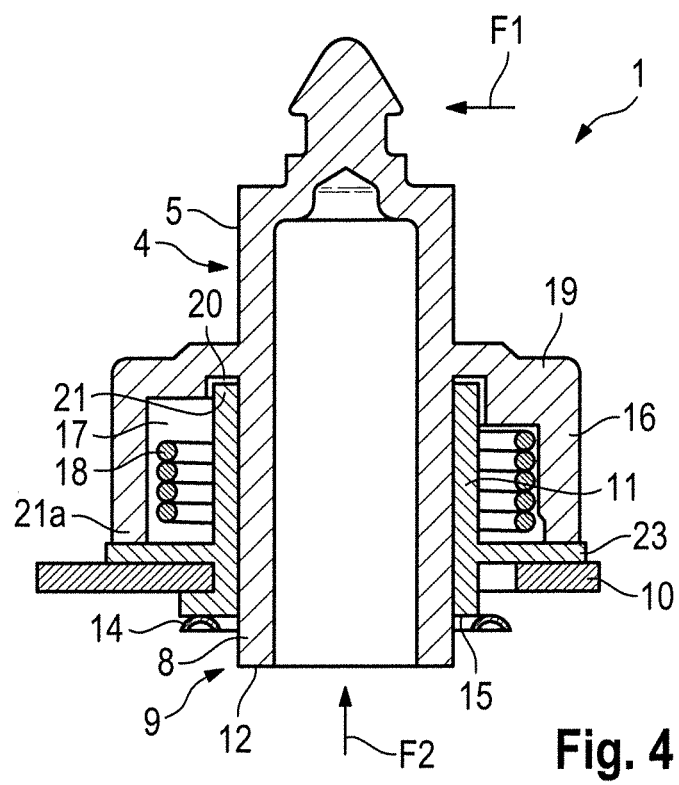
FIG. 4 is a vertical section through the assembled unlocking device with the correspondingly acting forces F1 and F2.
Figure 5:
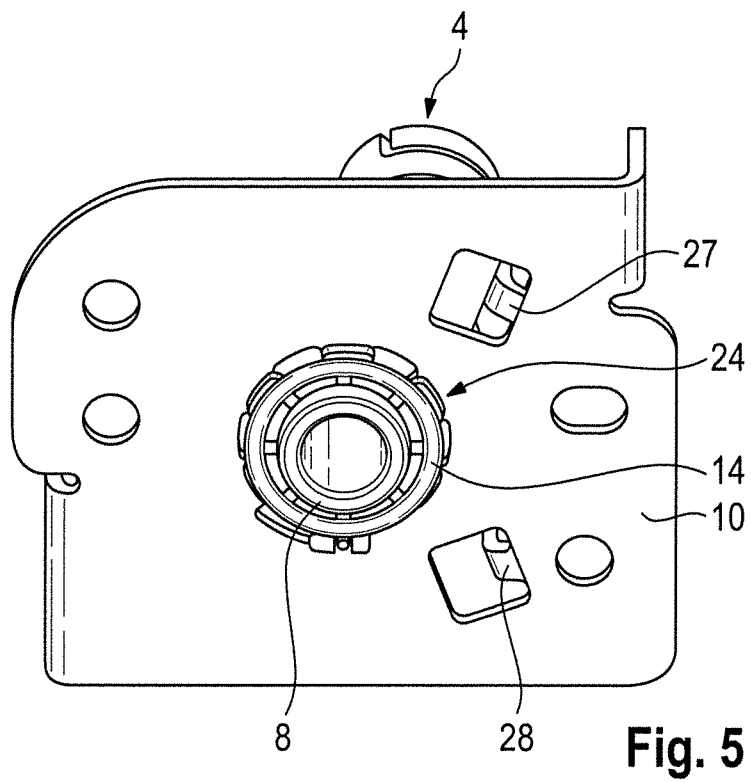
FIG. 5 is a view from below of the locking device with serrated ring and quarter-turn fastener.

The release lever 3 can be actuated in the arrow direction P (FIG. 2) with the force F1 (FIG. 4). Thus, the carrier element 4 is rotated in the elongate spacer bushing 11 counter to the tension of the spring element 18 and actuates the Bowden cables 6, 7. As a result, each catch hook 2 is unlocked from the clip element B in the vehicle hood H. Stops 27, 28 on the base plate 10 limit the pivoting of the carrier element 4 in both directions. After release of the release lever 3, the release lever pivots back into the starting position I thereof due to resilient returning forces of the spring element 18. The small axial forces F2 (FIG. 4) arising in the event of a possible "oblique tension" during the actuation are transmitted by the serrated ring 14 to the positionally fixed spacer bushing 11 and are absorbed by the spacer bushing 11.

What is claimed is:

1. An unlocking device for unlocking a vehicle hood relative to a vehicle body of a vehicle, the vehicle having at least one catch hook pivotally mounted to the vehicle body, and at least one Bowden cable having an end mounted to the at least one catch hook so that the at least one catch hook is pivotable via the at least one Bowden cable, the unlocking device comprising:

a base plate on the vehicle body and having opposite top and bottom surfaces and an opening extending therethrough, the opening having an array of circumferentially spaced recesses;

an elongate spacer bushing having opposite upper and lower ends and a bearing ring projecting out at a position between the upper and lower ends, circumferentially spaced cams at the lower end of the elongate spacer bushing, the elongate spacer bushing being inserted through the opening in the base plate with the cams aligned with the recesses and being engaged against the bottom surface of the base plate by rotating the elongate spacer bushing with the bearing ring engaging the top surface of the base plate so that the base plate is held between the bearing ring and the cams;

a carrier element having a cylindrical bearing sleeve with an elongate bushing shaft guided through the elongate spacer bushing so that a free end of the elongate bushing shaft projects beyond the bottom end of the elongate spacer bushing, the cylindrical bearing sleeve being axially rotatable in the elongate spacer bushing;

a serrated ring fastened around the free end of the elongate bushing shaft and supported against the lower end of the elongate spacer bushing; and a release lever mounted to a part of the carrier element projecting above the top surface of the base plate, wherein an end of the at least one Bowden cable remote from at least one catch hook is connectable to the carrier element so that rotation of the carrier element relative to the elongate spacer bushing can move the Bowden cable and pivot the catch hook.

2. The unlocking device of claim 1, wherein a cup-shaped annular bushing is formed around an outer circumference of the carrier element and defines a receiving space, a torsion spring element being disposed in the receiving space.

3. The unlocking device of claim 1, wherein the bearing ring of the elongate spacer bushing engages over the base plate from above and is connected in a positionally fixed manner to the base plate.

4. The unlocking device of claim 1, wherein the torsion spring element has an upper end disposed in the receiving space of the cup-shaped annular bushing and connected to the carrier element and the torsion spring element further having a turned-away lower end in the bearing ring of the spacer bushing in a manner hooked into a receiving opening.

5. The unlocking device of claim 2, wherein the cup-shaped annular bushing has a head wall formed with an annular rotational-guiding annular groove.

6. The unlocking device of claim 5, wherein the upper end of the spacer bushing is in the rotational-guiding annular groove.

7. The unlocking device of claim 6, wherein the cup-shaped annular bushing of the carrier element has a lower end supported rotatably on an upper surface of the bearing ring of the elongate spacer bushing.

* * * * *